United States Patent

Cheesebrow et al.

[11] Patent Number: 6,164,530
[45] Date of Patent: *Dec. 26, 2000

[54] DISK CARRIER WITH TRANSPONDER

[75] Inventors: Nicholas T. Cheesebrow, St. Paul; Shawn D. Eggum; Robert D. Kos, both of Victoria; Randy S. Williams, Chaska, all of Minn.

[73] Assignee: Fluoroware, Inc., Chaska, Minn.

[ * ] Notice: This patent is subject to a terminal disclaimer.

[21] Appl. No.: 08/225,228

[22] Filed: Apr. 8, 1994

[51] Int. Cl.⁷ ..................................................... G06K 5/00
[52] U.S. Cl. ............................................ 235/380; 235/376
[58] Field of Search .................................. 235/376, 380; 40/660, 663

[56] References Cited

U.S. PATENT DOCUMENTS

| | | | |
|---|---|---|---|
| 462,667 | 11/1891 | Goldbeck | 40/660 |
| 1,364,025 | 12/1920 | Billings | 283/901 |
| 1,372,036 | 3/1921 | Olsen | 283/901 |
| 4,242,663 | 12/1980 | Slobodin | 235/380 |
| 4,500,080 | 2/1985 | Aigo | 235/380 |
| 4,588,880 | 5/1986 | Hesser | 235/376 |
| 4,827,110 | 5/1989 | Rossi et al. | 235/376 |
| 4,833,306 | 5/1989 | Milbrett | 235/375 |
| 4,888,473 | 12/1989 | Rossi et al. | 235/376 |
| 5,389,769 | 2/1995 | Yamashita et al. | 235/375 |

*Primary Examiner*—Donald Hajec
*Assistant Examiner*—Mark Tremblay
*Attorney, Agent, or Firm*—Douglas J. Christensen

[57] ABSTRACT

The present invention provides a method and apparatus for monitoring the progress of a plurality of batches of semiconductor wafer or memory disks through a multiplicity of processing operations at various locations within a plant facility and maintaining information regarding the progress of each batch at the respective batch. The method includes the step of inserting each of the batches of wafers or memory disks in a carrier constructed and arranged for supporting the wafers or disks in parallel, axially arranged, spaced arrays. A transponder is embedded in a planar wall portion within each carrier by way of a recess extending inwardly from a lower edge of the wall portion. The transponder has a code to identify the carrier and a batch of wafers or disks contained therein and to further identify the various processing operations to which the batch has been subjected. The proximity of each carrier to various locations within the processing facility is detected by limited range read units each of which is positioned at one of the various locations and is constructed and arranged for determining the unique identification of any carrier within its detection range. Write units at various locations alter a status code in transponder to designate that a batch has been through a particular processing stage. Carrier identification information from the reader units also is stored and updated remotely to monitor the progress of batches through processing operations.

7 Claims, 2 Drawing Sheets

DISK CARRIER WITH TRANSPONDER

BACKGROUND OF THE INVENTION

This invention relates to the identification and tracking of batches of objects through a manufacturing process. More specifically, it relates to a method and apparatus for monitoring the progress of a plurality of batches of semiconductor wafers or memory disks through processing operations and for providing status coding at desired processing stations.

In the semiconductor manufacturing industry semiconductor wafers are moved through a manufacturing plant to a number of different locations where the semiconductor wafers are etched, cleaned, processed using photolithography operations, tested and subjected to various other manufacturing testing and processing operations. Similarly, memory disks are also moved through a sequence of manufacturing operations in a manufacturing facility.

It is common in the industry to handle the wafer or memory disks in batches contained within carriers specifically designed for the purpose of supporting the wafer or memory disks in the proper position for the manufacturing and processing machinery which may either process the disks or wafer while they remain in the carriers or remove them for a processing operation and then returns them to the carriers. A batch is defined and used hereinafter to mean one or more (up to the capacity of the carrier) of the semiconductor wafer or memory disks.

In a manufacturing plant, it is desirable to track the progress of a batch of wafer or memory disks through the manufacturing process. Moreover, it is desirable to be able to maintain at the batch, as opposed to a remote location, certain information relating to the processing or progress of the batch.

Use of transponder tags in the processing of disks has been disclosed in U.S. Pat. No. 4,827,110 issued to Rossi and Saucer and assigned to the assignee of this invention. Rossi et al. disclosed a method and apparatus in which a transponder tag was secured to the outside surface of a vertical wall.

SUMMARY OF THE INVENTION

The present invention provides a method and apparatus for monitoring the progress of a plurality of batches of semiconductor wafer or memory disks through a multiplicity of processing operations at various locations within a plant facility and maintaining information regarding the progress of each batch at the respective batch. The method includes the step of inserting each of the batches of wafers or memory disks in a carrier constructed and arranged for supporting the wafers or disks in parallel, axially arranged, spaced arrays. A transponder is embedded in a planar wall portion within each carrier by way of a recess extending inwardly from a lower edge of the wall portion. The transponder has a code to identify the carrier and a batch or disks contained therein and to further identify the various processing operations to which the batch has been subjected. The proximity of each carrier to various locations within the processing facility is detected by limited range read units each of which is positioned at one of the various locations and is constructed and arranged for determining the unique identification of any carrier within its detection range. Write units at various locations alter a status code in the transponder to designate that a batch has been through a particular processing stage. Carrier identification information from the reader units is also stored and updated remotely to monitor the progress of batches through processing operations.

An object and advantage of the present invention is that transponders may be incorporated into an existing carrier design with minimal alteration of the mold, resulting in substantial savings in tooling costs.

An object and advantage of the present invention is that there are minimal or no upwardly or sidewardly facing surfaces associated with the incorporation of the transponder in the carrier. This minimizes the possibility of processing or cleaning fluids leaching into crevices associated with the transponder attachment.

A further object and advantage of the invention is that the cover of the elongate recess is of minimal size and consequently the weld or juncture of the cover and the carrier is of minimal size. This further minimized the opportunity of the weld or juncture being attacked and compromised by processing or cleaning fluids. This minimizes the potential for the separation of the cover and transponder from the carrier.

A further object and advantage of the invention is that the cover of the recess and the transponder are optimally protected from interference with or contact by processing equipment.

A further object and advantage of the invention is that the assembly and incorporation of the transponder into the carrier is greatly simplified. The transponder may be inserted into the recess and a single cover of minimal size is welded in place to enclose the recess and retain the transponder.

DETAILED SPECIFICATION OF THE PREFERRED EMBODIMENT

Figure 1:
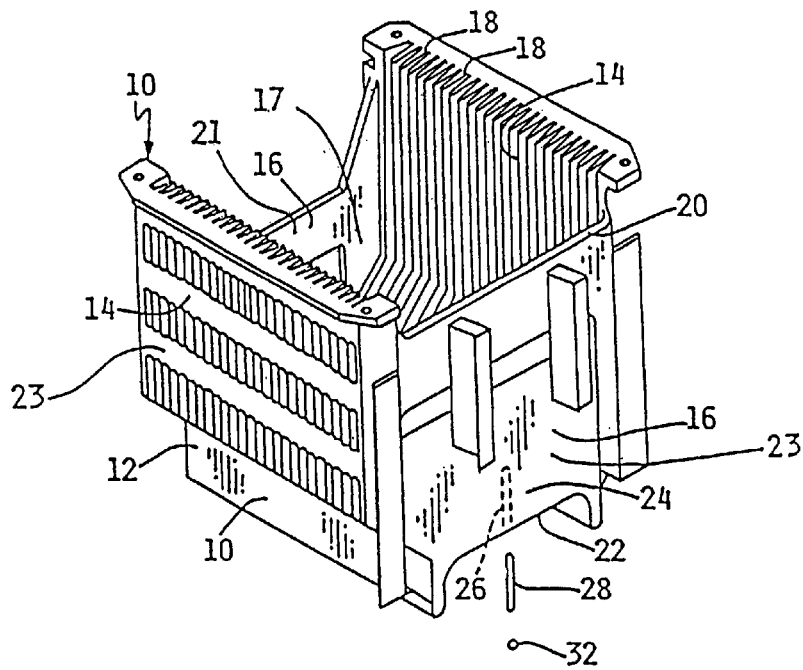
FIG. 1 is a partially exploded perspective view of a carrier with a cylindrical transponder and cover.
Figure 2:
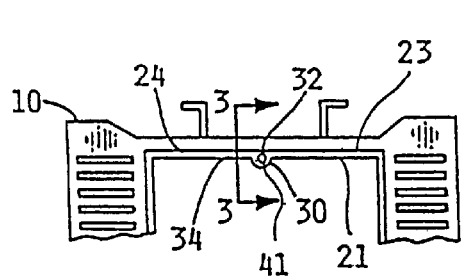
FIG. 2 is a bottom view of an end wall of the carrier.
Figure 3:
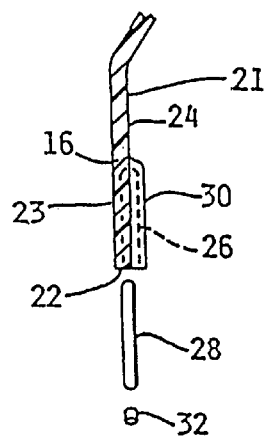
FIG. 3 is a partially exploded sectional view taken at plane 3—3 of FIG. 2.

A typical wafer or disk carrier suitable for transporting and supporting a plurality of semiconductor wafers or memory disks in a parallel axially arranged and spaced array is identified generally with reference character 20 in FIGS. 1, 2, and 3. Because the technology herein is equally suitable for semiconductor wafers or computer memory disks, the term "disk" hereinafter designates either type of product as well as any other generally similar product having a thickness which is substantially less than the width. The carriers may be part of shippers for transporting disks to locations remote from the processing facility, or may also be part of what are known as standardized mechanical interface (SMIF) pods. Such carriers have been offered commercially for a number of years by Fluoroware, Inc., 102 Jonathan Boulevard North, Chaska, Minn. 55318 and are in widespread use in the semiconductor manufacturing industry.

The carrier 10 consists of a molded body 12, with opposing sidewalls 14, and opposing end walls 16 defining an interior 17. Each wall has an interiorly facing surface 21 and an exteriorly facing surface 23. The sidewalls 14 include channels 18 sized for receiving and retaining the disks. The end walls 16 have an upper edge 20 and a lower edge 22. At a lower wall portion 24, an elongate recess 26 extends upwardly from the lower edge 22. The elongate recess 26 which is sized to hold a transponder 28. A protruding portion 30 extends inwardly with respect to the carrier 10 to accommodate the transponder 28. A cover 32 sized to fit and close the elongate recess 26 after the transponder 28 has been set in place is sealed to the carrier 10. Positioning the transponder 28 at the lower edge 22 of the end wall 16, allows the carrier 10 to be used with automated equipment without interference. Moreover, the configuration permits excellent drainage after the carrier 10 is immersed in liquids during cleaning or processing.

Figure 4:
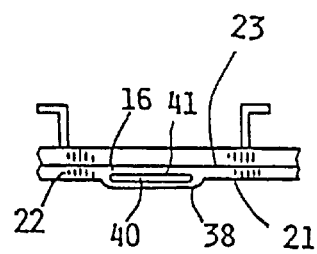
FIG. 4 is a bottom view of an end wall of an alternate embodiment of a carrier.
Figure 5:
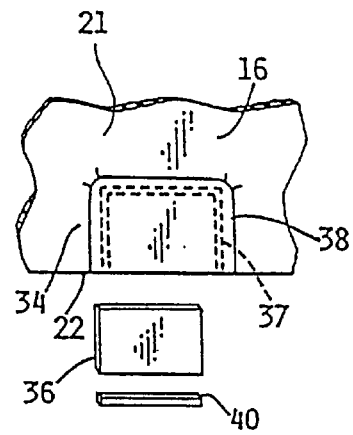
FIG. 5 is an inside perspective view of the wall portion of the embodiment shown in FIG. 4.

Referring to FIGS. 4 and 5, a bottom view and an inside perspective view of a wall portion 34 of an end wall 16 of an alternate embodiment of the invention are shown. This embodiment utilizes a planar shaped transponder 36 in a rectangular recess 37 extending from the lower edge 22. Depending on the thickness of the wall 16 and the thickness of the planar transponder 36, the wall 16 may be molded to have a protrusion 38 extending slightly inward for accommodating the transponder 36. An elongate cover 40 is welded in the opening of the recess 26 by conventional means, such as ultrasonically, to retain and enclose the transponder 36 in the rectangular recess 37. The covers 32, 40 meet the wall portion at the junction or weld 41.

Figure 6:
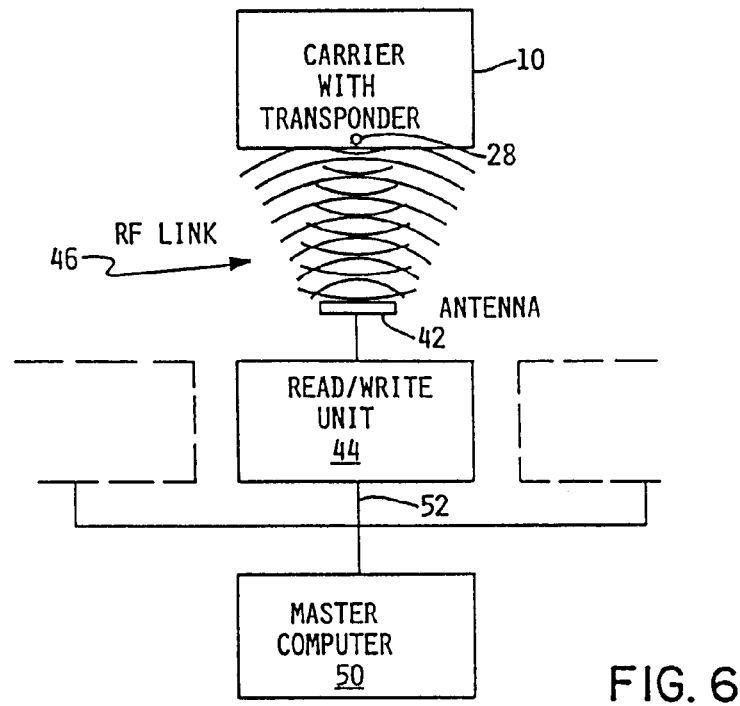
FIG. 6 is a system block diagram.

Referring to FIG. 6, the system block diagram, the operation of the read/write unit and transponder operation can be better understood. A single carrier 10 is shown for the purposes of illustration but it will be realized that in the manufacturing facility a plurality of carriers, which may or may not be identical, will be utilized to transport and store numerous batches of disks undergoing processing. The remote recognition read/write unit 44 drives an associated antenna 42 to propagate a radio frequency signal identified with reference numeral 46. Suitable read/write units are manufactured by and available through Texas Instruments, 12501 Research Boulevard, MS 2243, Austin, Tex. 78759. A suitable transponder model is a RI-TRP-WB2B-03 and a suitable read/write unit is a model No. RI-STU-W02G-01. Complete data sheets for said units with operating specifications and parameters are available from Texas Instruments by specifying said part numbers. Generally, the read/write units 44 and transponders 28 operate by the read/write unit 44 sending out a 132.5 kilohertz power pulse from the antenna 28. The field generated is absorbed by a tuned transponder antenna (not shown), which is rectified and stored in a capacitor (not shown). At the end of the power pulse the capacitor provides the power source to transmit back to the read/write unit. The data includes the identification code and the status code. The transponders have more than sufficient storage capacity for storing both the identification codes and status codes. Suitable transponders are available from other sources and may operate in different fashions.

In a manufacturing facility, a plurality of read/write units 44 would normally be used, each of which is typically stationed at a location adjacent to the place where a particular process or manufacturing operation takes place. The read/write units 44 output, in conventional fashion, to a master computer 50 for monitoring and storing the data. The unique identification number associated with a transponder 28 and the output signals from a particular read/write unit 44 allows the master computer 50 to determine at any point in time which of the carriers 10 is at a location of interest within the processing facility. The master computer 50 further may control the write function of the read/write units for labeling, that is, altering the status code of the transponders 28. The status code entered into the transponder 28 at a particular processing station allows a batch to be removed from the processing and later returned with the processing status of that batch readily identified on the transponder's code.

Figure 7:
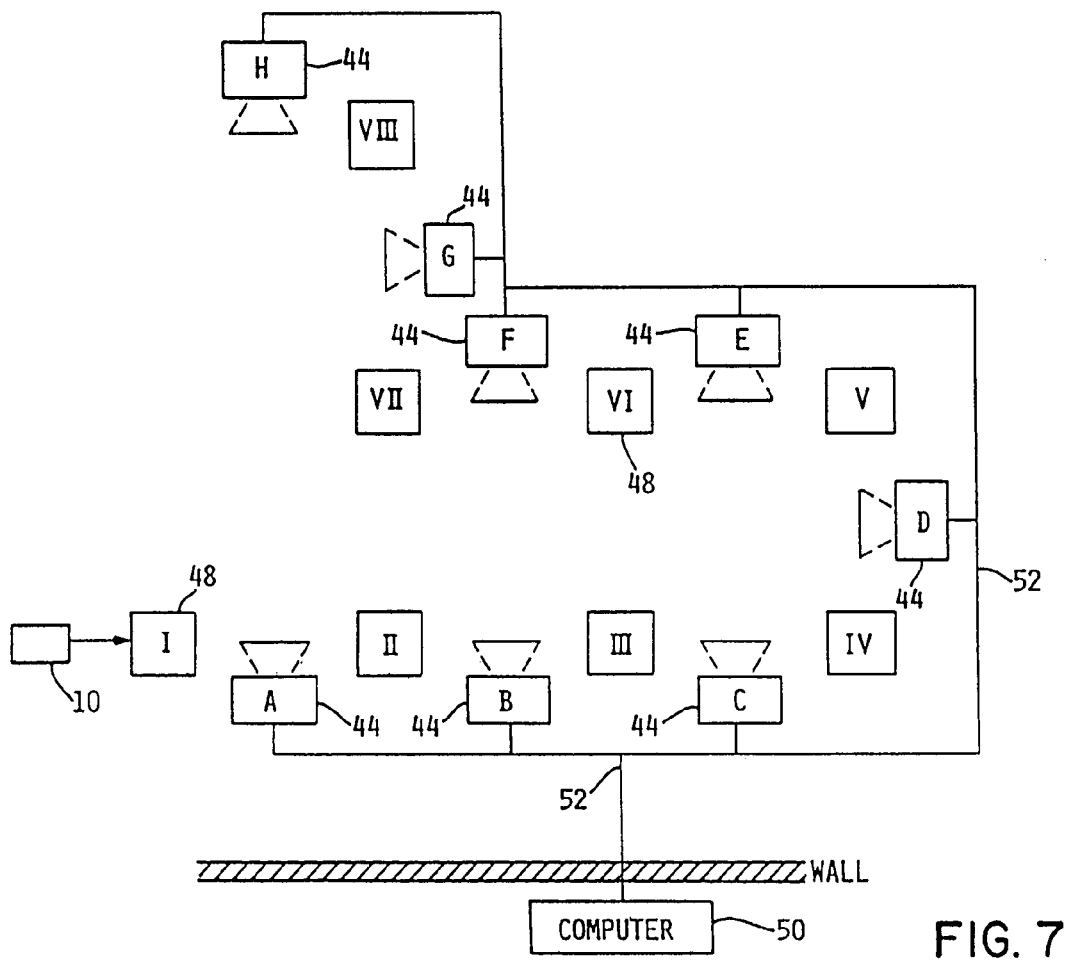
FIG. 7 is a schematic layout of a typical processing facility.

FIG. 7 illustrates a typical factory application where multiple remote read/write units 44 are each stationed at appropriate locations designated as processing station 48, I through VIII, within the processing facility. Each remote read/write unit 44 may function to read the status and identification code or to change the status code. Individual read units or write units may also be utilized. One or more read/write units may be positioned adjacent a particular station 48 to monitor and/or to change the status code of carriers 10 as they are received or dispatched from the station 48. The output of the read/write units 44, A–H are connected to a transmission line 52 which links them with the master computer 50 which can be positioned at any convenient location inside or outside of the manufacturing facility. As carriers 10 bearing unique codes move from station to station within the facility, the presence of the carrier 10 at various stations can be verified and logged by the master computer 50 which polls individual readers A–H. As the carriers enter or complete a particular process the status code of the particular batch may be altered to reflect said process.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A disk carrier for carrying a plurality of wafers, the carrier comprising:

a molded body having two pairs of opposing walls, the pairs of opposing walls joined together to form a generally rectangular body defining an interior, the body having a plurality of interiorly facing channels for receiving wafers in the interior, one of the walls having an integral wall portion with an inwardly facing surface, an opposite exteriorly facing surface, and an edge extending from the interiorly facing surface to the exteriorly facing surface, the wall portion further having a recess extending from the edge into the wall portion, the recess positioned intermediate the interiorly facing surface and the exteriorly facing surface;

a radio frequency transponder inserted in the elongate recess, the transponder having a unique identification code readable with an external reader unit; and a cover inserted in the recess for sealably enclosing the transponder within said recess the cover meeting the wall portion at a junction, the recess being elongate into the wall portion whereby the size of the junction is minimized.

2. The carrier of claim 1, wherein the edge is substantially normal to the interiorly facing surface and the exteriorly facing surface and the recess is substantially normal to the edge.

3. The disk carrier of claim 1, wherein the cover is welded into the recess thereby embedding the transponder into the carrier.

4. The disk carrier of claim 1, wherein one of the surfaces of the wall portion has a protruding portion along the recess for accommodating the recess with the inserted transponder.

5. The disk carrier of claim 1, wherein the transponder is programmable to accept a status code by an external write unit.

6. The disk carrier of claim 1, wherein the edge of the wall portion, from which the recess extends, faces downwardly whereby the junction also faces downwardly.

7. The disk carrier of claim 1, wherein the recess is parallel to the interiorly facing surface and the exteriorly facing surface.

* * * * *